Aug. 14, 1923.
R. L. WILLIAMSON
LUBRICATING ATTACHMENT FOR VEHICLE SPRINGS
Filed Oct. 12, 1921
1,464,688
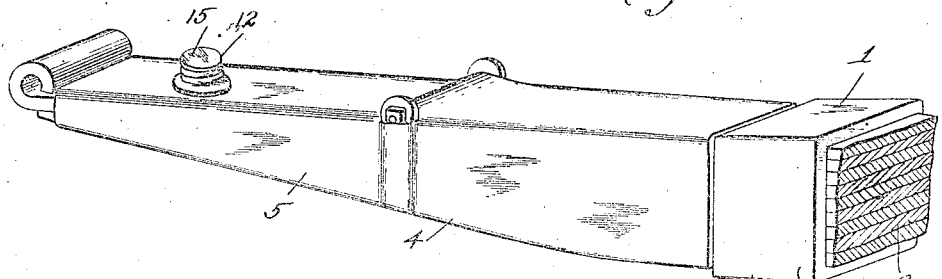
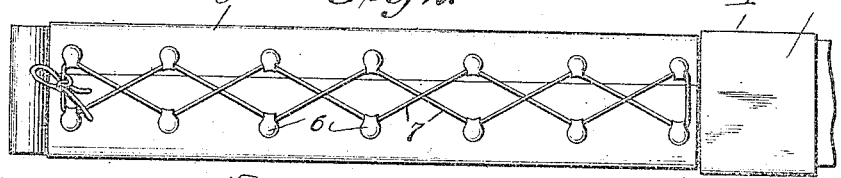
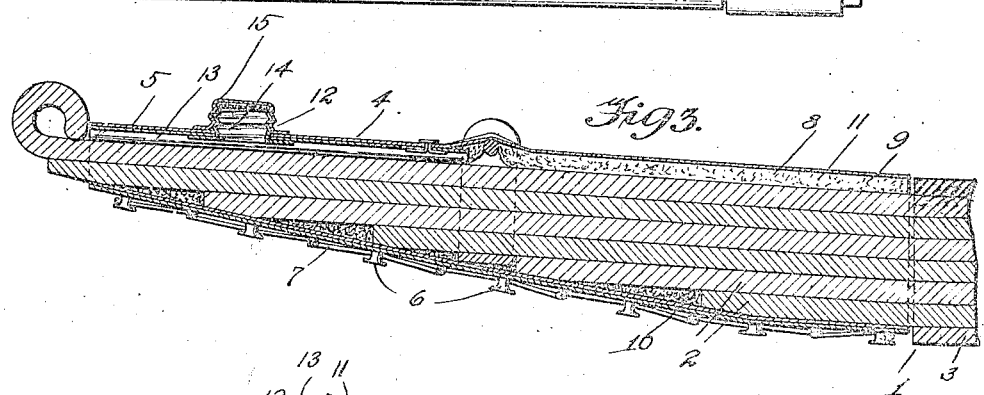
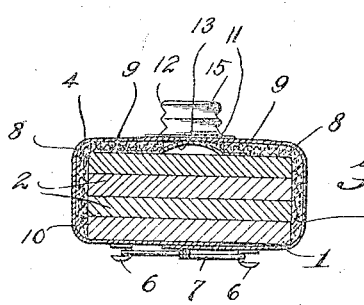
Inventor
Romeo L. Williamson
By C. C. Shepherd
Attorney Patented Aug. 14, 1923.

1,464,688

UNITED STATES PATENT OFFICE.

ROMEO L. WILLIAMSON, OF COLUMBUS, OHIO.

LUBRICATING ATTACHMENT FOR VEHICLE SPRINGS.

Application filed October 12, 1921. Serial No. 507,325.

*To all whom it may concern:*

Be it known that ROMEO L. WILLIAMSON, a citizen of the United States, residing at Columbus, in the county of Franklin and State of Ohio, has invented certain new and useful Improvements in Lubricating Attachments for Vehicle Springs, of which the following is a specification.

This invention relates to improvements in lubricating attachments for vehicle springs, and has for its object to provide an attachment of this character which will be in the nature of a covering capable of surrounding and encasing the leaves of a vehicle spring and to provide within the cover spaced layers of an absorbent material which are capable of being saturated with a fluid lubricant so that the adjoining surfaces existing between the several leaves of a vehicle spring, will be capable of being continuously lubricated in order to provide for proper relative movement therebetween without undue friction, stiffness or relative adhesion between the parts thereof.

Another object of the invention resides in the provision of a lubricating attachment of this nature wherein a leather covering, or an equivalent flexible material, is employed and so formed as to be capable of being readily attached around a spring structure by lacing or other suitable means, the said covering being situated so as to confine between the same and the outer surfaces of the spring structure, a pair of longitudinally extending spaced layers of an absorbent material, the latter being so situated as to extend along the top and sides of the spring, the layers of the material extending along the top of the spring being relatively spaced to produce a longitudinally extending lubricant groove, the arrangement being such that by introducing a fluid lubricant in the said groove, through a filling device provided in connection with the covering, the said lubricant being capable of passing longitudinally of the groove so that the layers of absorbent material may be substantially uniformly saturated with the lubricant throughout their length, the construction thus providing means for maintaining a spring structure properly lubricated throughout its length for relatively extended periods in an automatic and very efficient manner.

A further object of the invention resides in the provision of an attachment of this nature which may be quickly, easily and economically applied to vehicle springs of standard construction, and to form the attachment so that the same will thoroughly protect the leaves of a spring and to provide for the automatic and proper lubrication thereof.

With these and other objects in view, as will appear as the description proceeds, the invention accordingly consists in the novel features of construction, combinations of elements and arrangements of parts, hereinafter to be fully described and pointed out in the appended claims.

In the accompanying drawing:

Figure 1 is a perspective view showing the portion of the vehicle spring equipped with the lubricating attachment comprising the present invention, Figure 2 is a bottom plan view thereof, Figure 3 is a vertical longitudinal sectional view, and Figure 4 is a transverse vertical sectional view.

Referring more particularly to the details of the invention, the numeral 1 designates a vehicle spring of standard construction, the same including the usual superimposed leaves 2 of varying length, which are adapted to be united by means of the usual shackles 3. In order to provide means whereby a vehicle spring of this nature may be properly and efficiently protected and lubricated and to prevent undue adhesion between the adjoining surfaces of the several leaves thereof, the present invention provides a lubricating attachment, designated generally by the numeral 4, which is adapted to encase the spring 1 longitudinally so that the latter will be protected from the elements and to provide a method of lubrication which will prevent rust or corrosion between the leaves, in order that the spring may retain its normal resiliency and to thereby be capable of imparting efficient use when employed in connection with a motor vehicle.

The attachment 4 includes a leather or other flexible covering 5, which is adapted to be placed around the outer surfaces of the spring 1 and to be firmly maintained in its applied position. To this end, the longitudinally extending adjoining edges of the covering are overlapped adjacent to the under surfaces of the spring 1, and said edges are provided in this instance with lacing hooks 6, through and around which a cord 7 may be trained, this construction permitting the said casing to be readily attached in a positive and taut condition about the spring 1 and yet to be capable of being readily removed therefrom if necessity should so require. Adapted to be situated between the outer surface of the spring 1 and the covering 5 is a pair of longitudinally extending pads 8, each of which is preferably formed from an absorbent material, such as felt, and are so situated as to engage with the upper surfaces of the spring and also with the sides of the spring, each upper portion of the pads being indicated by the numeral 9 and each side thereof by the numeral 10. These pads are adapted to extend substantially throughout the length of the covering 5 so as to act in conjunction with the latter for the purpose of protecting the leaves of said spring.

It will be noted that the portions 9 of the pads 8 are relatively separated to provide therebetween a longitudinally extending groove 11, and the outer and upper end of this groove is disposed to communicate with a filling device 12. This device consists of a metallic strip 13, whose outer edges are disposed to engage with the upper surface of the spring 1, and the intermediate portions thereof are bowed or bent so as to extend into the groove 11 between the portions 9 of the pads. The central portion of the strip is provided with a threaded neck 14, which projects through an opening provided in the covering 5, and the outer end of the neck being equipped with a threaded closure 15 which may be removed at will.

By this construction it will be manifest that the spring 1, when provided with the attachment comprising the present invention, may be lubricated and maintained in perfect working order by removing the closure 15. This permits a quantity of a fluid lubricant to be inserted into the groove 11, the said lubricant flowing downwardly into the groove by way of the intermediately bent portions of the strip 13. It will be observed that when the oil is received within the groove, the same will flow longitudinally throughout substantially the length of the groove, in order to be capable of quickly and uniformly engaging all parts of the portions 9 of the pads. Since the pads are formed from an absorbent material, it follows that by a capillarity the lubricant will be drawn through the pads so as to saturate substantially the sides 10 thereof, the groove 11 allowing the sides 10 to be uniformly saturated when the lubricant is inserted into the spring. By the permeation of the sides 10 on the part of the lubricant, it will be apparent that the joints between the leaves 2 of the spring 1 may at all times be properly supplied with a suitable quantity of the lubricant to enable proper relative movement to take place between said leaves, and to thereby prevent the latter from unduly adhering to one another in such manner as to sacrifice some of the resiliency of the spring. The attachment serves to properly lubricate the springs for relatively extended periods, prevents rust and corrosion from occurring within the spring, and also facilitates the operation of lubricating a spring by simply requiring at relatively infrequent intervals the placing of a lubricant within the groove 11. It will thus be seen that the attachment will require but a minimum of attention, and to all intents and purposes will be substantially automatic in operation.

What is claimed is:

1. In a lubricating attachment for vehicle springs, a flexible covering adapted to be detachably secured around the leaves of a vehicle spring, a pad formed from an absorbent material adapted to be positioned between the leaves of said spring and said covering, said pad being formed to include portions capable of extending parallel with the sides and top of said spring, said pad being divided to provide a longitudinally extending lubricant groove on the top of said spring, and means cooperative with said covering for permitting of the introduction of a lubricant into said groove.

2. In a lubricating attachment for vehicle springs, a flexible covering arranged to extend longitudinally of and around the leaves of a vehicle spring, a pair of pads formed from an absorbent material confined between said covering and spring, said pads being situated to extend parallel with the sides and top of said spring, the upper adjacent edges of said pads being relatively separated to provide a longitudinally extending groove, and means for permitting of the introduction of a lubricant into said groove.

3. In a lubricating attachment for vehicle springs, a flexible covering adapted to surround and to extend longitudinally of the leaves of a vehicle spring, means carried by the edges of said covering to effect the fastening of the latter in connection with said spring, a pair of spaced pads of an absorbent material adapted to be confined between said covering and said spring, said pads including portions arranged to extend parallel with the sides and top of said spring, the edges of said pads extending along the top of said spring being relatively separated to provide a longitudinally extending groove capable of receiving a lubricant, and means for permitting of the introduction and retention of a lubricant within said groove.

4. In a lubricating attachment for vehicle springs, a flexible covering arranged to surround and to extend longitudinally of the leaves of a vehicle spring, a padding of an absorbent material positioned between said covering and spring, said padding being disposed to engage with the upper and side edges of said spring and having its upper portion situated to form a longitudinally extending lubricant receiving groove, a metallic strip having an intermediately bent portion being disposed to be received within said groove and a filling cap carried by said strip and arranged to project through said covering.

In testimony whereof I affix my signature.

ROMEO L. WILLIAMSON.